US008369430B2

(12) United States Patent
Bahng et al.

(10) Patent No.: US 8,369,430 B2
(45) Date of Patent: Feb. 5, 2013

(54) METHOD FOR DETECTING SIGNAL, DEVICE FOR DETECTING SIGNAL, AND RECEIVING DEVICE

(75) Inventors: Seungjae Bahng, Daejeon (KR); Junghyun Kim, Uljeongbu-si (KR); Hoon Lee, Daejeon (KR); Youn Ok Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 236 days.

(21) Appl. No.: 12/766,340

(22) Filed: Apr. 23, 2010

(65) Prior Publication Data
US 2010/0272205 A1 Oct. 28, 2010

(30) Foreign Application Priority Data
Apr. 27, 2009 (KR) .................. 10-2009-0036496

(51) Int. Cl.
*H04K 1/10* (2006.01)
*H04L 27/28* (2006.01)
(52) U.S. Cl. ................ 375/260; 375/259; 455/59
(58) Field of Classification Search .......... 375/260
See application file for complete search history.

(56) References Cited

U.S. PATENT DOCUMENTS

| 2006/0029149 | A1 | 2/2006 | Kim et al. | |
| 2008/0137782 | A1 | 6/2008 | Bahng et al. | |
| 2008/0240277 | A1* | 10/2008 | Anholt et al. | 375/262 |
| 2010/0172443 | A1* | 7/2010 | Shim et al. | 375/320 |

FOREIGN PATENT DOCUMENTS
KR      10-0808663      2/2008

OTHER PUBLICATIONS

Seungjae Bahng, Youn-Ok Park, and Jaekwon Kim, "QR-LRL Signal Detection for Spatially Multiplexed MIMO Systems", IEICE Transactions on Communications, vol. E91-B, No. 10, pp. 3383-3386, Oct. 2008.

Junghyun Kim, Youn-Ok Park, and Seungjae Bahng, "Efficient Soft-Output Generation Method for Spatially Multiplexed MIMO Systems", IEICE Transactions on Communications, vol. E92-B, No. 11, pp. 3512-3515, Nov. 2009.

JungHyun Kim, Seungjae Bahng, and Youn-Ok Park, "A Signal Detection Method based on the Double Detection for Spatially Multiplexed MIMO Systems", the Journal of the Korea Institute of Communication Sciences (KICKS), vol. 34, No. 6, pp. 634-641, Jun. 2009.

* cited by examiner

*Primary Examiner* — Erin File
(74) *Attorney, Agent, or Firm* — Staas & Halsey LLP

(57) ABSTRACT

The present invention relates to a method for detecting a signal, a device for detecting a signal, and a receiving device. A method for detecting a signal according to the present invention is a method for detecting a signal from a receiving device in a communication system including a multi-output multi-input antenna, including: estimating a channel matrix of a signal received from a plurality of receiving antennas; generating at least one channel matrix groups by aligning the channel matrix and generating at least one transmitting signal group by aligning a transmitting signal to be estimated to correspond thereto; determining a first candidate vector in consideration of all constellation points for a first layer of the at least one transmitting signal group; determining a second candidate vector in consideration of all constellation points for a second layer of the at least one transmitting signal group; generating a final candidate vector including the first candidate vector and the second candidate vector; and calculating a soft output using the final candidate vector.

17 Claims, 3 Drawing Sheets

METHOD FOR DETECTING SIGNAL, DEVICE FOR DETECTING SIGNAL, AND RECEIVING DEVICE

CROSS-REFERENCE TO RELATED APPLICATION

This application claims priority to and the benefit of Korean Patent Application No. 10-2009-0036496 filed in the Korean Intellectual Property Office on Apr. 27, 2009, the entire contents of which are incorporated herein by reference.

BACKGROUND OF THE INVENTION (a) Field of the Invention

The present invention relates to a method for detecting a signal, a device for detecting a signal, and a receiving device.

(b) Description of the Related Art

With the development of wireless communication systems, the demand for speed has increased. In order to meet the demand, a need exists for a use of a wide frequency bandwidth. However, frequency resources are limited. Therefore, as a method for transmitting more data while using a limited frequency bandwidth, a multi-input multi-output (MIMO) antenna technology has been used.

The multi-input multi-output antenna technology is largely sorted into a spatial diversity scheme that obtains a diversity gain corresponding to a product of the number of transmitting antennas and the number of receiving antennas to improve reliability of transmission, and a spatial multiplexing (SM) scheme that transmits other data streams via different paths.

In the case of the spatial multiplexing scheme, since mutual interference can occur between different data streams, a receiver should detect a signal in consideration of the interference and decode it. The signal detecting scheme may include a scheme for obtaining maximum likelihood of each data bit, a linear detecting scheme, a non-linear detecting scheme, etc. However, the maximum likelihood scheme cannot be easily implemented since it is too complicated due to the number of antennas, etc. The linear detecting scheme may include a zero forcing (ZF) scheme and a minimum mean square error (MMSE) scheme. These schemes have low complexity but the performance thereof is deteriorated due to noise amplification. The non-linear detecting scheme may include an ordered successive interference cancellation scheme (OSIC) called vertical Bell lab layered space-time (VBLAST) architecture. This can be relatively easily implemented but does not have satisfactory performance.

The above information disclosed in this Background section is only for enhancement of understanding of the background of the invention and therefore it may contain information that does not form the prior art that is already known in this country to a person of ordinary skill in the art.

SUMMARY OF THE INVENTION

A technical object of the present invention is to perform signal detection with low complexity while securing performance in a communication system including a multi-input multi-output antenna.

A method for detecting a signal according to an exemplary embodiment of the present invention is a method for detecting a signal from a receiving device in a communication system including a multi-output multi-input antenna, including: estimating a channel matrix of a signal received from a plurality of receiving antennas; generating at least one channel matrix group by aligning the channel matrix and generating at least one transmitting signal group by aligning a transmitting signal to be estimated to correspond thereto; determining a first candidate vector in consideration of all constellation points for a first layer of the at least one transmitting signal group; determining a second candidate vector in consideration of all constellation points for a second layer of the at least one transmitting signal group; generating a final candidate vector including the first candidate vector and the second candidate vector; and calculating a soft output using the final candidate vector.

The method for detecting a signal may further include performing QR decomposition on the at least one channel matrix group to generate a unitary matrix and an upper triangular matrix.

The determining of the first candidate vector may determine the first candidate vector using the upper triangular matrix with respect to remaining layers other than the first layer among the at least one transmitting signal group, and the determining of the second candidate vector may determine the second candidate vector using the upper triangular matrix with respect to remaining layers other than the second layer among the at least one transmitting signal group.

The method for detecting a signal may further include generating a Hermitian received signal by applying a Hermitian matrix to the received signal.

The determining of the first candidate vector may determine the first candidate vector additionally using the Hermitian received signal with respect to the remaining layers other than the first layer among the at least one transmitting signal group, and the determining of the second candidate vector may determine the second candidate vector additionally using the Hermitian received signal with respect to the remaining layers other than the second layer among the at least one transmitting signal group.

The number of the at least one channel matrix group and the at least one transmitting signal group may be equal to a value found by rounding a value obtained by dividing the number of receiving antennas by 2.

Each of first layers and second layers of the at least one transmitting signal group may be different.

The at least one transmitting signal group may include the first transmitting signal group, and the first layer of the first transmitting signal group may be arranged with a least reliable layer, while the second, third, and fourth layers are arranged in order from highest reliability to lowest reliability.

The at least one transmitting signal group may include the second transmitting signal group, and in the second transmitting signal group, the remaining layers other than the first and second layers may be arranged in order from highest reliability to lowest reliability after performing a row movement on the first transmitting group by a numeral that is a product of a value equal to a value of the number of receiving antennas minus times 2.

A device for detecting a signal according to another exemplary of the present invention is a device for detecting a signal in a communication system including a multi-output multi-input antenna, including: a channel estimator that estimates a channel matrix for a signal received from a plurality of receiving antennas; at least one layer aligning unit that outputs a channel matrix group by aligning the channel matrix and outputs transmitting signal groups by aligning a transmitting signal to be estimated to correspond thereto; at least one candidate vector generator that determines a first candidate vector in consideration of all constellation points for a first layer of the transmitting signal group, determines a second candidate vector in consideration of all constellation points for a second layer of the transmitting signal group, and generates a final candidate vector including the first candidate vector and the second candidate vector; and a soft output generator that calculates a soft output using the final candidate vector.

The device for detecting a signal may further include at least one QR decomposing unit that performs QR decomposition on the channel matrix groups to generate a unitary matrix and an upper triangular matrix.

The first candidate vector may be determined using the upper triangular matrix with respect to remaining layers other than the first layer among the transmitting signal groups, and the second candidate vector may be determined using the upper triangular matrix with respect to remaining layers other than the second layer among the transmitting signal groups.

The first candidate vector may be determined using a Hermitian received signal by applying a Hermitian matrix to the received signal with respect to the remaining layers other than the first layer among the transmitting signal groups, and the second candidate vector may be determined using a Hermitian received signal with respect to the remaining layers other than the second layer among the transmitting signal groups.

Each number of the layer aligning units and the candidate vector generators may be equal to a value found by rounding a value obtained by dividing the number of receiving antennas by 2.

The first layers and the second layers of the transmitting signal groups output from the layer aligning unit may be different.

The transmitting signal group output from each of the layer aligning units may include the first transmitting signal group, and the first layer of the first transmitting signal group may be arranged with a least reliable layer, while the second, third, and fourth layers are arranged in order from highest reliability to lowest reliability.

The transmitting signal group may include the second transmitting signal group, and in the second transmitting signal group, the remaining layers other than the first and second layers may be arranged in order from highest reliability to lowest reliability after performing a row movement on the first transmitting signal group by a numeral that is a product of a value equal to a value of the number of receiving antennas minus times 2.

A receiving device according yet another embodiment of the present invention is a receiving device in a wireless communication system, including: a plurality of receiving antennas; a signal detector that generates at least one transmitting signal group by aligning a transmitting signal to be estimated, determines a first candidate vector in consideration of all constellation points for a first layer of the transmitting signal group, and determines a second candidate vector in consideration of all constellation points for a second layer of the transmitting signal group to generate a soft output from the first and second candidate vectors; and a decoder that decodes the soft output.

The number of transmitting signal groups may be equal to a value found by rounding a value obtained by dividing the number of receiving antennas by 2.

The transmitting signal group may include the first and second transmitting signal groups, and the first layer of the first transmitting signal group may be arranged with a least reliable layer, and then the second, third, and fourth layers are arranged in order from highest reliability to lowest reliability, and in the second transmitting signal group, remaining layers other than the first and second layers may be arranged in order from highest reliability to lowest reliability after performing a row movement on the first transmitting group by a numeral that is a product of a value equal to the number of receiving antennas minus 1, and 2.

The present invention can perform the signal detection with low complexity while securing performance in the communication system including the multi-input multi-output antenna.

DETAILED DESCRIPTION OF THE EMBODIMENTS

Figure 1:
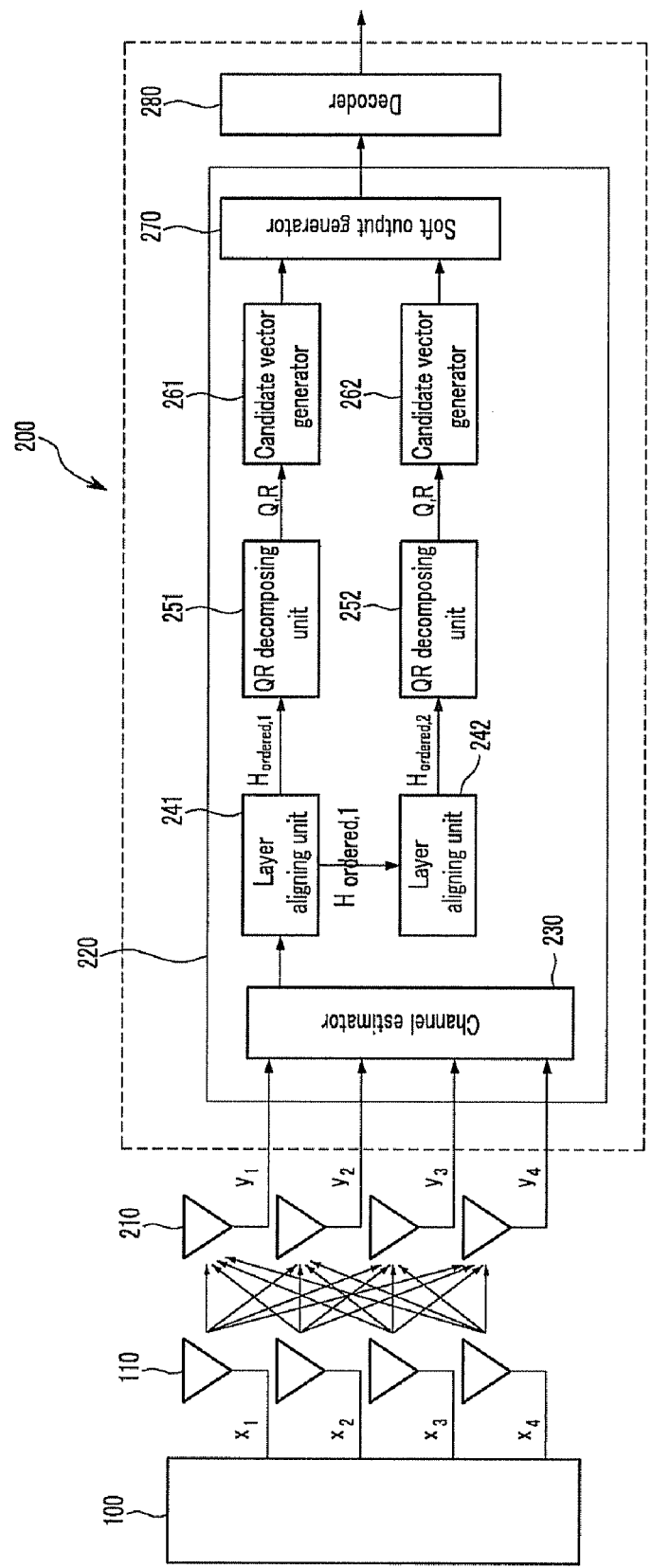
FIG. 1 is a diagram showing a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

Hereinafter, a device for detecting a signal and a method for detecting a signal according to an exemplary embodiment of the present invention will be described with reference to the accompanying drawings.

FIG. 1 is a diagram showing a wireless communication system according to an exemplary embodiment of the present invention.

Referring to FIG. 1, the wireless communication system includes a transmitting device 100 and a receiving device 200.

The transmitting device 100 includes a plurality of transmitting antennas 110. The transmitting device 100 performs scrambling, encoding, modulation, demultiplexing, etc., on transmitting data and radiates them to the air via each transmitting antenna 110. Herein, the demultiplexing means separating data into a plurality of data layers according to the number of transmitting antennas 110, wherein the term "layer" has the same meaning as a stream.

The receiving device 200 includes a plurality of receiving antennas 210, a signal detector 220, and a decoder 280.

The receiving antenna 210 receives a signal in parallel from the transmitting antenna 110.

The signal detector 220 includes a channel estimator 230, a plurality of layer aligning units 241 and 242, a plurality of QR decomposing units 251 and 252, a plurality of candidate vector generators 261 and 262, and a soft output generator 270.

The channel estimator 230 performs channel estimation on a received signal.

The layer aligning units 241 and 242 align the estimated channel (H) to output the aligned matrix, such that the transmitting signal to be estimated is aligned to conform to an order of the aligned matrix. The number L of layer aligning units 241 and 242 is defined according to the number of receiving antennas 210, and depends on the following Equation 1.

$$L = \text{round } m/2 \qquad \text{[Equation 1]}$$

Herein, m is the number of receiving antennas 210, and "round" means raising the quotient to the next whole number.

In other words, when the number of receiving antennas 210 is two, three, four, five, and six, the number of layer aligning units 241 and 242 is one, two, two, three, and three, respectively. In the present exemplary embodiment, a case where the number of receiving antennas 210 is four and the number of layer aligning units 241 and 242 is two will be described as an example.

The layer alignment unit 241 aligns the estimated channel (H) to generate the first channel matrix group $H_{ordered,1}$, and aligns the transmitting signal to be estimated to correspond thereto to generate a first transmitting signal group and to output it to the QR decomposing unit 251 and the layer aligning unit 252. The layer aligning unit 252 again aligns the first channel matrix group $H_{ordered,1}$ and the first transmitting signal group to generate the second channel matrix group $H_{ordered,1}$ and a second transmitting signal group and to output it to the QR decomposing unit 252.

Each of the QR decomposing units 251 and 252 performs the QR decomposition on the transmitted first channel matrix group and second channel matrix group, respectively. The number of QR decomposing units 251 and 252 is equal to the number of layer aligning units 241 and 242.

Each of the candidate vector generators 261 and 262 determines the candidate vector using a received signal (y) and a QR decomposed channel matrix. At this time, each of the candidate vector generators 261 and 262 determines the candidate vectors in consideration of points on all possible constellations (hereinafter referred to as constellation points) with respect to the first and second layers among the first transmitting signal groups that are aligned in each of the layer aligning units 241 and 242. In other words, the candidate vector generator 261 determines the first candidate vector in consideration of all possible constellation points with respect to the first layer of the first transmitting signal group, and determines the second candidate vector in consideration of all possible constellation points with respect to the second layer of the second transmitting signal group, to generate a final candidate vector including the first and second candidate vectors. Further, the candidate vector generator 262 also determines the first candidate vector in consideration of all possible constellation points with respect to the first layer of the second transmitting signal group aligned in the layer aligning unit 242, and determines the second candidate vector in consideration of all possible constellation points with respect to the second layer, to generate a final candidate vector including the first and second candidate vectors.

The number of candidate vector generators 261 and 262 is equal to the number of QR decomposing units 251 and 252 and the number of layer aligning units 241 and 242.

The soft output generator 270 calculates the soft outputs using the final candidate vectors from the candidate vector generators 261 and 262.

The decoder 280 performs decoding based on the soft output.

Hereinafter, a method for detecting a signal according to the exemplary embodiment of the present invention will be described with reference to FIG. 2.

Figure 2:
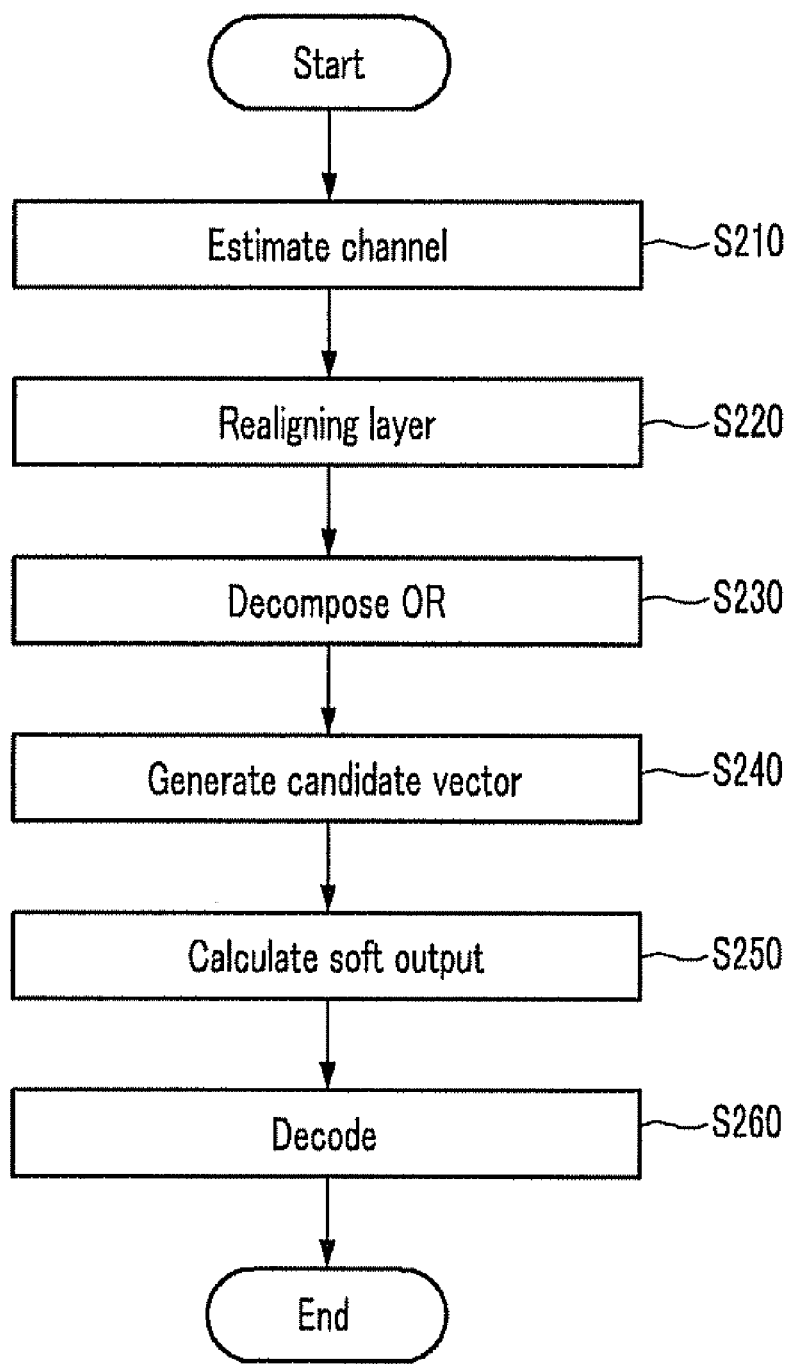
FIG. 2 is a flowchart showing a method for detecting a signal according to the exemplary embodiment of the present invention.

FIG. 2 is a flowchart showing a method for detecting a signal according to the exemplary embodiment of the present invention.

First, the channel estimation is performed on the received signal (y) received through the receiving antenna 210 (S210).

In the communication system where there are m transmitting antennas 110 and n receiving antennas 210, the relationship between the transmitting signal $x=[x_1\ x_2\ \ldots\ x_m]^T$ and the received signal $y=[y_1\ y_2\ \ldots\ y_n]T$ is represented by the following Equation 2.

$$y = Hx + z \qquad \text{[Equation 2]}$$

$$\underbrace{\begin{bmatrix} y_1 \\ y_2 \\ \vdots \\ y_n \end{bmatrix}}_{y} = \underbrace{\begin{bmatrix} h_{11} & h_{12} & \ldots & h_{1m} \\ h_{21} & h_{22} & \ldots & h_{2m} \\ \vdots & \vdots & \ddots & \vdots \\ h_{n1} & h_{n2} & \ldots & h_{nm} \end{bmatrix}}_{H} \underbrace{\begin{bmatrix} x_1 \\ x_2 \\ \vdots \\ x_m \end{bmatrix}}_{x} + \underbrace{\begin{bmatrix} z_1 \\ z_2 \\ \vdots \\ z_n \end{bmatrix}}_{z}$$

Herein, H means the channel matrix, and $x_i$, $i=1, 2, \ldots, m$ is a signal transmitted from the i-th transmitting antenna 110, $y_j$, $j=1, 2, \ldots, n$ is a signal received in the j-th receiving antenna 210, and $z_j$, $j=1, 2, \ldots, n$ is noise, wherein $h_{ij}$, $i=1, 2, \ldots, m$, $j=1, 2, \ldots, n$ represent a channel gain between the i-th transmitting antenna 110 and the j-th receiving antenna 210.

Thereafter, the layer aligning units 241 and 242 aligns the channel matrix (H) (S220). In more detail, the layer aligning unit 241 aligns the channel matrix (H) to generate the first channel matrix group $H_{ordered,1}$ and aligns the transmitting signal to correspond thereto to output the first transmitting signal group, and the layer aligning unit 242 again aligns the first channel matrix group $H_{ordered,1}$ to generate the second channel matrix group $H_{ordered,2}$ and aligns the transmitting signal to correspond thereto to output the second transmitting signal group. At this time, in each of the first transmitting signal group and the second transmitting signal group, the first and second aligned layers are different from each other. Hereinafter, one example of the rule outlined as above will be described in detail.

The first channel matrix group $H_{ordered,1}$ first arranges a least reliable layer (LRL) as the first layer and a most reliable layer (MRL) as the second layer, and the remaining layers are arranged in order from highest reliability to lowest reliability.

When the number of transmitting antennas 110 is four and the number of receiving antennas 210 is four, the first channel matrix group $H_{ordered,1}$ aligned according to the rule may be represented by the following Equation 3.

$$H_{ordered,1} = [H_{(1)}{}^{3rdRL} h_{(2)}{}^{2ndRL} h_{(3)}{}^{MRL} h_{(4)}{}^{LRL}] \qquad \text{[Equation 3]}$$

First, the second channel matrix group $H_{ordered,2}$ performs a recursive row movement on the first channel matrix group $H_{ordered,1}$ by $2 \times (j-1)$, and the remaining layers other than the first and second layers are arranged in order from highest reliability to lowest reliability. The second channel matrix group $H_{ordered,2}$ aligned as above may be represented by the following Equation 4.

$$H_{ordered,2} = [H_{(1)}{}^{LRL} h_{(2)}{}^{MRL} h_{(3)}{}^{3rdRL} h_{(4)}{}^{2ndRL}] \qquad \text{[Equation 4]}$$

Referring to Equation 3 and Equation 4, the first arranged least reliable layer $h_{(4)}{}^{LRL}$ and the second arranged most reliable layer $h_{(3)}{}^{MRL}$ in the first channel matrix group $H_{ordered,1}$ are different from the first arranged second highest reliable layer $h_{(4)}^{2nd\ RL'}$, and the second arranged third highest layer $h_{(1)}^{3rdRL}$ in the second channel matrix group $H_{ordered,2}$.

Then, each of the QR decomposing units 251 and 252 performs the OR decomposition on the transmitted first channel matrix group $H_{ordered,1}$ and second channel matrix group $H_{ordered,2}$ as represented by Equation 5 (S230).

$$H = QR = Q\begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix} \quad \text{[Equation 5]}$$

Herein, Q is a unitary matrix and R is an upper triangular matrix having an upper portion thereof, including a diagonal component.

Thereafter, the candidate vector generators 261 and 262 generate the candidate vectors (V), respectively, (S240). A method for generating a candidate vector (Vf) is as follows.

First, a signal ($\tilde{y}$) is generated according to the following Equation 6 by applying a Hermitian matrix ($Q^H$) to the received signal (y).

$$\tilde{y} = Q^H y \quad \text{[Equation 6]}$$

Then, the first candidate vector (V1) is determined in consideration of all the constellation points of the first layer ($x_{(4)}$). Other layers ($x_{(3)}, x_{(2)}, x_{(1)}$) other than the first layer ($x_{(4)}$) are continuously obtained from the R component and the signal ($\tilde{y}$) obtained in the channel matrix.

For example, the second, third, and fourth arranged layers $x_{(3)}, x_{(2)}, x_{(1)}$ can be obtained according to the following Equation 7, Equation 8, and Equation 9, respectively.

$$x_{(3)} = \text{slicing}\left(\frac{\tilde{y}_3 - r_{34}x_{(4)}}{r_{33}}\right) \quad \text{[Equation 7]}$$

$$x_{(2)} = \text{slicing}\left(\frac{\tilde{y}_2 - r_{23}x_{(3)} - r_{24}x_{(4)}}{r_{22}}\right) \quad \text{[Equation 8]}$$

$$x_{(1)} = \text{slicing}\left(\frac{\tilde{y}_1 - r_{12}x_{(2)} - r_{13}x_{(3)} - r_{14}x_{(4)}}{r_{11}}\right) \quad \text{[Equation 9]}$$

Herein, slicing is process that performs mapping to the nearest constellation points.

As such, the first candidate vector (V1=$[x_{(1)}x_{(2)}x_{(3)}x_{(4)}]^T$) corresponding to the number of constellation points with respect to all the constellation points of the first layer ($x_{(4)}$) can be finally obtained.

Then, the second candidate vector V2 is determined in consideration of all the constellation points of the second layer ($x_{(3)}$). Layers ($x_{(4)}, x_{(2)}, x_{(1)}$) other than the second layer ($x_{(3)}$) are continuously obtained from the R component and the signal ($\tilde{y}$) obtained from the channel matrix.

For example, the first arranged layer ($x_{(4)}$) can be obtained according to the following Equation 10, and the third and fourth arranged layers ($x_{(2)}, x_{(1)}$) can be obtained according to the foregoing Equation 8 and Equation 9.

$$x_{(4)} = \text{slicing}\left(\frac{\tilde{y}_3 - r_{33}x_{(3)}}{r_{34}}\right) \quad \text{[Equation 10]}$$

As such, the second candidate vector (V2=$[X_{(1)}\ x_{(2)}\ x_{(3)}\ x_{(4)}]^T$ corresponding to the number of constellation points with respect to all the constellation points of the second layer ($x_{(3)}$) can be finally obtained.

The final candidate vector (V) is generated by collecting the first and second candidate vectors V1 and V2 obtained as described above. The candidate vector generators 261 and 262 respectively perform the above processes.

Thereafter, the soft output is calculated using the final candidate vector (V) (S250). The soft output corresponding to a k-th bit within I-th symbol is a log likelihood ratio, and can be represented by the following Equation 11 through maximum log approximation.

$$L(b_{k,l}|y) \approx \min_{\substack{x \in S(k,l)^-\\ s(k,l)^- \subset V}} D(x) - \min_{\substack{x \in S(k,l)^+\\ s(k,l)^+ \subset V}} D(x) \quad \text{[Equation 11]}$$

Herein, $S(k,l)^-$ means a set of the candidate vectors corresponding to $b_{k,l}=-1$, and $s(k,l)^+$ means a set of the candidate vectors corresponding to $b_{k,l}=+1$. Further, D(x) means Euclidean distances for the candidate vectors of each bit ($b_{k,l}$) of the transmitting signal, and in the exemplary embodiment of the present invention, is defined by $$D(x) = \frac{1}{\sigma^2}\|y - Hx\|^2,$$

while V means a set of the candidate vectors. Meanwhile, when considering all the constellation points for one layer, there may be no $S(k,l)^-$ or $S(k,l)^+$ for a specific bit. This case is referred to an empty vector set. In the case of the empty vector set, the soft output is not calculated, and thus the performance is deteriorated. In order to solve the problem of the empty vector set, all possible constellation points of all the layers are considered, but complexity is excessively increased. Therefore, the candidate vectors are generated in consideration of all the constellation points with respect to the first and second layers among the layer groups aligned in a predetermined method according to the present invention and other candidate vectors are generated in consideration of all the constellation points with respect to the first and second layers among the layer group aligned according to other methods, and if the soft output is calculated based on all the generated candidate vectors, the problem of the empty vector set can be solved without increasing the complexity.

Finally, the decoding is performed using the calculated soft output (S260).

Hereinafter, the effect of the method for detecting a signal according to the exemplary embodiment of the present invention will be described with reference to FIG. 3.

Figure 3:
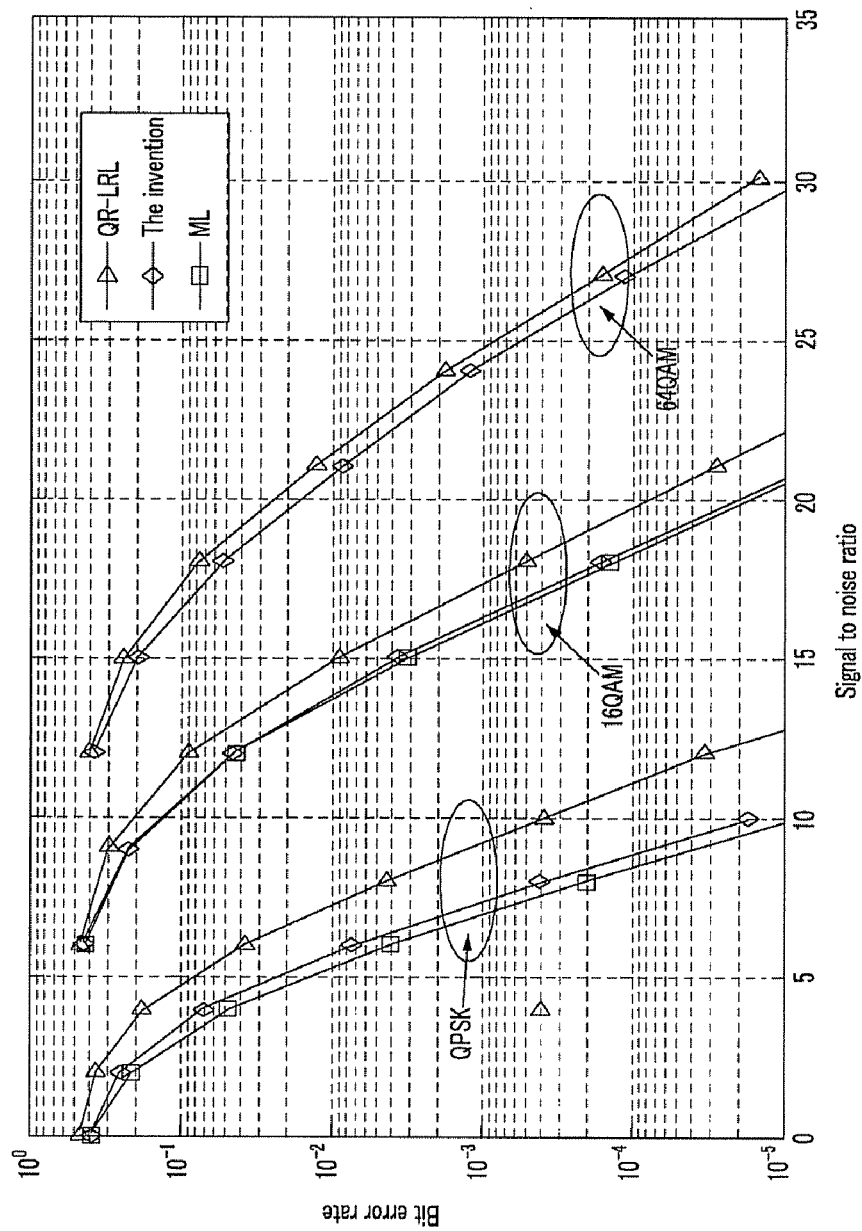
FIG. 3 is a graph showing a bit error rate according to a signal-to-noise (SNR) ratio in a method for detecting a signal according to the exemplary embodiment of the present invention and in a method for detecting a signal according to the related art.

FIG. 3 is a graph showing a bit error rate according to a signal-to-noise (SNR) ratio in a method for detecting a signal according to the exemplary embodiment of the present invention and in a method for detecting a signal according to the related art.

Referring to FIG. 3, a case of A is a case of considering all the constellation points only with respect to any one layer, and in particular, a case of considering all the constellation points with respect to the least reliable layer, and a case of B is a case of considering all the constellation points with respect to all the layers. FIG. 3 represents the performance of the method for detecting each signal by, for example, a bit error rate, in the case of quadrature phase shift keying (hereinafter referred to as "QPSK"), 16-quadrature amplitude modulation (hereinafter referred to as "QAM"), and 64-QAM.

Since the case of B is a case of considering all possible constellation points with respect to all the layers, the complexity is very high. However, according to FIG. 3, it can be appreciated that the bit error rate with the same signal-to-noise ratio (SNR) is lower than the case of A or the exemplary embodiment of the present invention to improve the performance. Since the case of A is a case of considering all possible constellation points only with respect to one layer, it is lower in view of complexity than the case of B. However, according to FIG. 3, it can be appreciated that the bit error rate in the same signal-to-noise ratio (SNR) is higher than the case of B or the exemplary embodiment of the present invention to make the performance relatively poor. With the exemplary embodiment of the present invention, when considering possible constellation points with respect to the layers by a numeral that is a product of a value found by rounding a value obtained by dividing the number of receiving antennas by 2, and 2, the complexity is higher than the case of A, but is even lower than the case of B. However, according to FIG. 3, it can be appreciated that the exemplary embodiment of the present invention has a bit error rate almost approximating the case of B with the same signal-to-noise ratio (SNR). In other words, with the exemplary embodiment of the present invention, the performance can be improved without significantly increasing the complexity of the signal detection.

The above-mentioned exemplary embodiments of the present invention are not only embodied only by a method and apparatus. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for detecting a signal from a receiving device in a communication system comprising a multi-output multi-input antenna, comprising:
   estimating a channel matrix of a signal received from a plurality of receiving antennas;
   generating at least one channel matrix group by aligning the channel matrix, and generating at least one transmitting signal group by aligning a transmitting signal to be estimated to correspond thereto;
   determining a first candidate vector in consideration of all constellation points for a first layer of the at least one transmitting signal group;
   determining a second candidate vector in consideration of all constellation points for a second layer of the at least one transmitting signal group;
   generating a final candidate vector comprising the first candidate vector and the second candidate vector; and
   calculating a soft output using the final candidate vector,
   wherein the determining of the first candidate vector determines the first candidate vector using the upper triangular matrix with respect to remaining layers other than the first layer among the at least one transmitting signal group, and the determining of the second candidate vector determines the second candidate vector using the upper triangular matrix with respect to remaining layers other than the second layer among the at least one transmitting signal group,
   wherein the determining of the first candidate vector determines the first candidate vector using the upper triangular matrix with respect to remaining layers other than the first layer among the at least one transmitting signal group, and the determining of the second candidate vector determines the second candidate vector using the upper triangular matrix with respect to remaining layers other than the second layer among the at least one transmitting signal group.

2. The method for detecting a signal of claim 1, further comprising performing QR decomposition on the at least one channel matrix group to generate a unitary matrix and an upper triangular matrix.

3. The method for detecting a signal of claim 1, further comprising generating a Hermitian received signal by applying a Hermitian matrix to the received signal.

4. The method for detecting a signal of claim 3, wherein the determining of the first candidate vector determines the first candidate vector additionally using the Hermitian received signal with respect to the remaining layers other than the first layer among the at least one transmitting signal group, and the determining of the second candidate vector determines the second candidate vector additionally using the Hermitian received signal with respect to the remaining layers other than the second layer among the at least one transmitting signal group.

5. The method for detecting a signal of claim 2, wherein the number of the at least one channel matrix groups and the at least one transmitting signal groups is equal to a value found by rounding a value obtained by dividing the number of receiving antennas by 2.

6. The method for detecting a signal of claim 5, wherein each of first layers and second layers of the at least one transmitting signal group is different.

7. The method for detecting a signal of claim 1, wherein the at least one transmitting signal group comprises the first transmitting signal group, and a first layer of the first transmitting signal group is arranged with a least reliable layer, while a second, third, and fourth layers are arranged in order from highest reliability to lowest reliability.

8. The method for detecting a signal of claim 7, wherein the at least one transmitting signal group comprises the second transmitting signal group, and in the second transmitting signal group, the remaining layers other than a first and second layers are arranged in order from highest reliability to lowest reliability after performing a row movement on the first transmitting group by a numeral that is a product of a value equal to a value of the number of receiving antennas minus 1 and then times 2.

9. A device for detecting a signal in a communication system including a multi-output multi-input antenna, comprising:
   a channel estimator that estimates a channel matrix for a signal received from a plurality of receiving antennas;
   at least one layer aligning unit that outputs a channel matrix group by aligning the channel matrix and outputs transmitting signal groups by aligning a transmitting signal to be estimated to correspond thereto;
   at least one candidate vector generator that determines a first candidate vector in consideration of all constellation points for a first layer of the transmitting signal group, determines a second candidate vector in consideration of all constellation points for a second layer of the transmitting signal group, and generates a final candidate vector including the first candidate vector and the second candidate vector; and a soft output generator that calculates a soft output using the final candidate vector, wherein the first candidate vector is determined using the upper triangular matrix with respect to remaining layers other than the first layer among the transmitting signal groups, and the second candidate vector is determined using the upper triangular matrix with respect to remaining layers other than the second layer among the transmitting signal groups, wherein the first candidate vector is determined using the upper triangular matrix with respect to remaining layers other than the first layer among the transmitting signal groups, and the second candidate vector is determined using the upper triangular matrix with respect to remaining layers other than the second layer among the transmitting signal groups.

10. The device for detecting a signal of claim 9, further comprising at least one QR decomposing unit that performs QR decomposition on the channel matrix groups to generate a unitary matrix and an upper triangular matrix.

11. The device for detecting a signal of claim 9, wherein the first candidate vector is determined using a Hermitian received signal by applying a Hermitian matrix to the received signal with respect to the remaining layers other than the first layer among the transmitting signal groups, and the second candidate vector is determined using the Hermitian received signal with respect to the remaining layers other than the second layer among the transmitting signal groups.

12. The device for detecting a signal of claim 9, wherein each number of the layer aligning units and the candidate vector generators is equal to a value found by rounding a value obtained by dividing the number of receiving antennas by 2.

13. The device for detecting a signal of claim 12, wherein each of the first layers and the second layers of the transmitting signal groups output from the layer aligning unit are different.

14. The device for detecting a signal of claim 9, wherein the transmitting signal group output from each of the layer aligning units includes the first transmitting signal group, and a first layer of the first transmitting signal group is arranged with a least reliable layer, while a second, third, and fourth layers are arranged in order from highest reliability to lowest reliability.

15. The device for detecting a signal of claim 14, wherein the transmitting signal group includes the second transmitting signal group, and in the second transmitting signal group, the remaining layers other than a first and second layers are arranged in order from highest reliability to lowest reliability after performing a row movement on the first transmitting signal group by a numeral that is a product of a value equal to a value of the number of receiving antennas minus 1 and then times 2.

16. A receiving device in a wireless communication system, comprising:

a plurality of receiving antennas;

a signal detector that generates at least one transmitting signal group by aligning a transmitting signal to be estimated, determines a first candidate vector in consideration of all constellation points for a first layer of the transmitting signal group, and determines a second candidate vector in consideration of all constellation points for a second layer of the transmitting signal group to generate a soft output from the first and second candidate vectors; and a decoder that decodes the soft output, wherein the number of transmitting signal groups is equal to a value found by rounding a value obtained by dividing the number of receiving antennas by 2, wherein the number of transmitting signal groups is equal to a value found by rounding a value obtained by dividing the number of receiving antennas by 2.

17. The receiving device of claim 16, wherein the transmitting signal group includes the first and second transmitting signal groups, and the first layer of the first transmitting signal group is arranged with a least reliable layer, and then the second, third, and fourth layers are arranged in order from highest reliability to lowest reliability, and in the second transmitting signal group, remaining layers other than the first and second layers are arranged in order from highest reliability to lowest reliability after performing a row movement on the first transmitting group by a numeral that is a product of a value equal to the number of receiving antennas minus 1, and then times 2.

* * * * *